United States Patent [19]

Tufano

[11] 3,797,874

[45] Mar. 19, 1974

[54] VEHICLE BUMPER IMPACT ABSORBING SYSTEM

[76] Inventor: John J. Tufano, 102 Stewart St., New Britain, Conn. 06053

[22] Filed: July 12, 1972

[21] Appl. No.: 271,155

[52] U.S. Cl. .................................. 293/86, 267/34
[51] Int. Cl. ............................................ B60r 19/06
[58] Field of Search ........ 267/34, 116, 139; 293/70, 293/85, 86, 89, DIG. 2, DIG. 5

[56] References Cited
UNITED STATES PATENTS

| | | | |
|---|---|---|---|
| 3,295,880 | 1/1967 | Klosterman | 293/85 |
| 2,508,347 | 5/1950 | Marsh | 293/85 |
| 3,482,829 | 12/1969 | Kidby | 267/34 |

FOREIGN PATENTS OR APPLICATIONS

| | | | |
|---|---|---|---|
| 100,153 | 8/1961 | Netherlands | 293/DIG. 2 |

*Primary Examiner*—Gerald M. Forlenza
*Assistant Examiner*—Robert Saifer
*Attorney, Agent, or Firm*—Burns, Doane, Swecker & Mathis

[57] ABSTRACT

A vehicle bumper impact assembly includes a guide cylinder carried by the vehicle frame, and an impact cylinder slidable within the guide cylinder and securable to the bumper at its outer end. A coil compression spring and a fluid type shock absorber unit are disposed between the guide cylinder and the impact cylinder to resist inward movement of the impact cylinder. An abutment is positioned on the frame to limit inward travel of the impact cylinder and to provide means for mounting the coil spring and the shock absorber unit.

4 Claims, 6 Drawing Figures

VEHICLE BUMPER IMPACT ABSORBING SYSTEM

BACKGROUND OF THE INVENTION

The invention relates to an impact absorbing system utilized in conjunction with a vehicle bumper.

The rising number of vehicles presently traveling the highways has greatly increased the incidents of relatively low-speed collisions occurring between vehicles. This fact, coupled with the mounting costs of repairing vehicles damaged in such collisions, has made it desirable that vehicles be provided with impact-absorbing devices capable of cushioning the impacts of front and rear end low-speed collisions without the occurrence of appreciable damage to the areas of the vehicle located adjacent the bumpers, such as fenders, grill-work and radiator.

Bumper impact absorbing systems have been heretofore proposed. These systems, in order to be effective, have been characterized by structures which are complex and relatively expensive to construct. Many of these proposed systems are highly inconvenient in that they require that parts of the system be repaired or replaced after each collision in order that the system may again be made operable. Also, numerous ones of the prior proposed systems render the vehicle incapable of being towed or lifted by means of the bumper, thus reducing the usefulness of the bumper.

SUMMARY OF THE INVENTION

It is a general object of the invention to provide a vehicle bumper impact absorbing system which will alleviate or substantially eliminate the above-stated problems.

It is a principal object of the invention to provide a vehicle bumper impact absorbing system which will effectively cushion front and rear end low-speed collisions occurring to a vehicle, without appreciable damage being imparted to the vehicle.

It is a further object of the invention to provide such an impact absorbing system which will effectively cushion a potentially dangerous impact and subsequently automatically return to an operative position.

It is an additional object of the invention to provide such an impact absorbing system which may be fabricated from inexpensive, readily available materials.

It is yet another object of the invention to provide such an impact absorbing system which will enable the bumper to be utilized in towing and/or lifting the vehicle.

In accordance with a preferred embodiment, the cushioning system includes a pair of impact absorbing assemblies connected between the frame and one or both bumpers of a vehicle. Each assembly includes a tubular guide element carried by the frame and a tubular impact element telescopingly received therein. A bumper bracket carried by the tubular impact element secures the tubular impact element to the bumper. A spring is operably arranged between the tubular impact element and the tubular guide element to yieldably resist movement of the bumper and impact element toward the tubular guide element. A fluid-type shock absorber, or dampener, unit of the piston-cylinder type is disposed within and connected between the tubular guide element and tubular impact element to resist sudden, inward movement of the bumper and to dampen outward recoil of the spring. The spring and shock absorber serve to effectively cushion low speed impacts sustained by the bumper.

An abutment is arranged to extend across the path of inward travel of the impact element within the guide element. The abutment is positioned such that, upon the occurrence of an impact to the bumper which is not fully absorbed by the spring and shock absorber, the impact element will "bottom-out," i.e., strike the abutment, before reaching the vehicle body. Subsequently, the spring will automatically restore the bumper to its original position wherein it is immediately operable to receive further impacts.

The spring is preferably in the form of a coil compression spring which is disposed between and operably engages the bumper bracket and the abutment to resist inward movement of the bumper. The abutment, due to a unique configuration, also provides a flange to which one end of the shock absorber unit may be secured, with the other end thereof being attached to the bumper bracket.

The impact absorbing system is designed such that it may employ, as a tubular guide element, a cylindrical portion of the vehicle frame rail which is standard in many vehicles. Alternatively, a separate tubular piece, suitably configured, may be secured to the frame to function as a guide element.

A vehicle utilizing a bumper impact absorbing system according to the invention is capable of being both towed and lifted by means of the bumper. Such operations are facilitated by the use of a piston-cylinder shock absorber unit, the piston and piston rod parts of which being engageable with wall portions of the cylinder, during towing and jacking of the bumper, to provide a force-transmitting connection between the bumper and the vehicle frame.

DETAILED DESCRIPTION OF THE DRAWINGS

This preferred embodiment of the invention is illustrated in the accompanying drawings in which.

DETAILED DESCRIPTION OF A PREFERRED EMBODIMENT OF THE INVENTION

Figure 1:
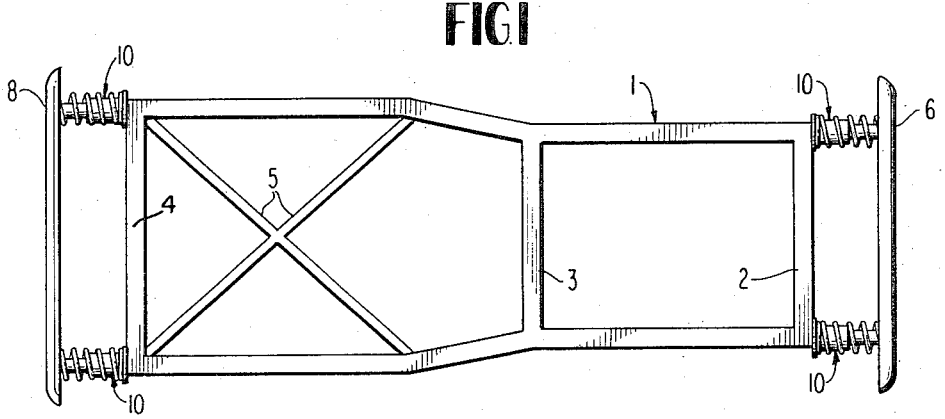
FIG. 1 is a plan view of a vehicle frame which is provided with a bumper impact absorbing system according to the invention.

FIG. 1 illustrates a vehicle frame 1 which may be of any conventional type and which may include various bracing members 2, 3, 4, and 5. The frame is provided with a pair of bumpers 6 and 8 at its front and rear ends, respectively. The bumpers 6 and 8 are each mounted to the vehicle frame by means of a pair of impact absorbing assemblies 10.

Figure 2:
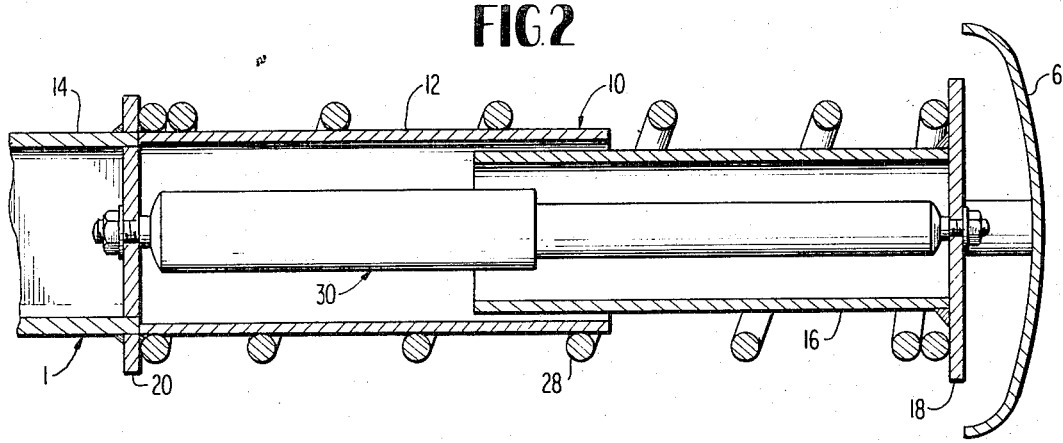
FIG. 2 is a longitudinal sectional view of an impact absorbing assembly in an assembled condition.

As is best shown in FIG. 2, each impact absorbing assembly 10 includes a tubular guide element which is preferably in the form of a guide cylinder 12. The guide cylinder 12 is carried by the frame 1 in a suitable location, such as at the end of a frame rail 14 of the frame 1. In many vehicles, at the time of construction, the frame rails 14 are provided at their terminal ends with additional metal pieces which are fashioned into a cylindrical configuration. In vehicles of this type, these cylindrical end pieces may be utilized as tubular guide elements for the invention.

Vehicles which are not constructed with such cylindrical pieces may be provided with tubular elements suitably welded at the ends of the frame rails 12, as shown in FIG. 2. Alternatively, the tubular guide elements may be fastened at any convenient location on the frame, such as on the brace members 2, 4.

The shock absorbing assembly 10 further includes a tubular impact element. The impact element is preferably in the form of an impact cylinder shaped complementary to the guide element 12. In this fashion, the impact cylinder is telescopingly received and reciprocably slidable within the guide cylinder. Thus, there may be a relatively loose fit between the impact element 16 and the guide cylinder 12.

A bumper bracket 18 is suitably fastened, as by welding, to the outer end of the impact cylinder 16 and is secured in a conventional fashion to the bumper 6.

Figure 3:
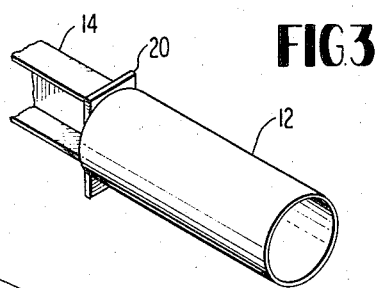
FIG. 3 is a partial perspective view of the assembly with parts omitted.
Figure 4:
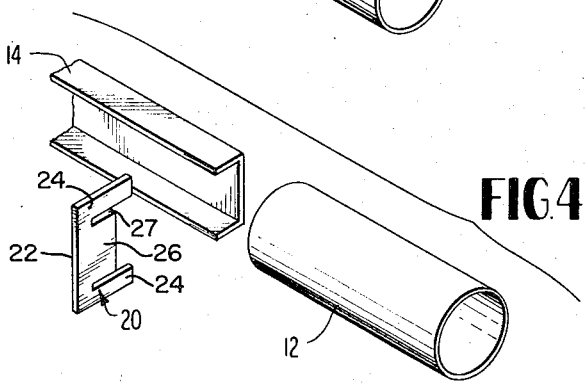
FIG. 4 is an exploded view of the parts illustrated in FIG. 3.

An abutment plate 20 is fixedly secured, as by welding or the like, at the junction of the rail 14 and the guide cylinder 12. The abutment plate 20 may be welded to one or both of the rail and the guide cylinder. The abutment plate 20 includes a vertical portion 22, with a pair of arms 24 and a flange 26 projecting outwardly therefrom. The flange 26 and the arms 22 define a pair of slots 27 therebetween to accomodate the legs of the frame rail when the abutment plate is inserted into position as can be seen in FIGS. 3 and 4.

A coil compression spring 28 is operably disposed between the bumper bracket 18 and the arms 24 of the abutment plate 20. The spring is shown in a neutral position in FIGS. 2 and 5. The spring is of a suitably heavy duty design to provide a cushioning of impacts imparted to the bumper during relatively low speed collisions, i.e. 0–30 m.p.h., or possibly higher.

A spring force dampener is connected between the flange 26 of the abutment plate and the bumper bracket 18. This dampener may comprise a conventional shock absorber 30 of the fluid-operating piston-cylinder type, as are commonly utilized in vehicle suspension systems, for example. The shock absorber 30 functions to assist in the cushioning of sudden impacts occurring to the bumper, and also dampens the subsequent recoil motion of the spring 28.

OPERATION

Figure 5:
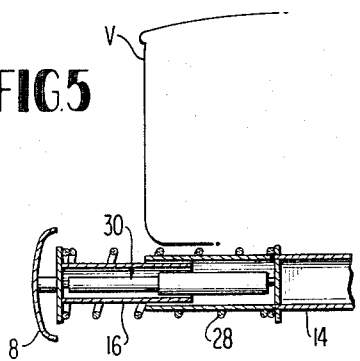
FIG. 5 is an elevational view, partly in section, of an impact absorbing assembly in a neutral posture.

Prior to a collision occurring to a vehicle, the impact absorbing assembly 10 assumes the neutral position shown in FIG. 5 wherein the bumper 8 is disposed outwardly of the vehicle 5. Upon the occurrence of a collision, the bumper 8 will be pushed inwardly toward the vehicle. This inward motion is cushioned by the dual effects of the spring 28 and the shock absorber 30 of both shock absorber assemblies associated with the bumper, as they are compressed.

In many instances the cushioning effects provided by the spring 28 and shock absorber 30 will be sufficient to prevent the bumper from contacting and damaging the vehicle components adjacent the impact absorbing assemblies, such as fenders, grillwork, radiator and the like.

Figure 6:
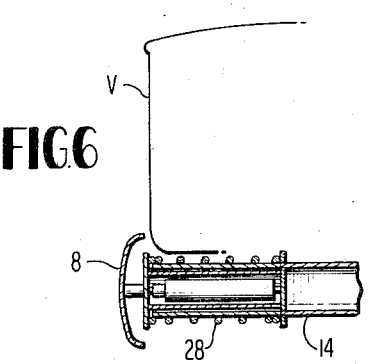
FIG. 6 is a view similar to FIG. 5 illustrating the assembly in a collapsed, impact absorbing posture.

If the impact is of a magnitude which cannot be completely cushioned by the spring and shock absorber, then the impact cylinder 16 will "bottom out," i.e., strike the abutment plate 20 short of engaging the vehicle body, as shown in FIG. 6. In most low speed impacts, the abutment plate 20 will serve to halt movement of the bumper and prevent serious damage from occurring to the vehicle.

Once the collision impact has terminated, the spring 28 will automatically extend and return the bumper and the components of the impact absorbing assemblies to their extended, or neutral, posture shown in FIG. 5.

Due to the use of piston-cylinder shock absorber units 30, the impact absorbing assemblies according to the invention facilitate towing and lifting of the vehicle by means of the bumper. Thus, when the vehicle is being towed by the bumper, the shock absorber units 30 will extend to a maximum length until the pistons thereof engage the ends of the shock absorber cylinders in force-transmitting relation. Likewise, when the vehicle is being lifted by means of the bumper, such as by a jack, the shock absorbers 30 will function to transmit the lifting force to the vehicle frame.

MAJOR ADVANTAGES AND SCOPE OF THE INVENTION

The vehicle bumper impact absorbing assembly according to the invention is effective in cushioning low speed collisions while preventing the occurrence of appreciable damage to the vehicle. Moreover, the assembly is operable to subsequently automatically return to a neutral posture.

The impact absorbing assembly may be fabricated from relatively inexpensive, readily available materials. In many instances, an integral part of the vehicle frame rail may be utilized as a guide element, thus saving further expense.

Additionally, the impact absorbing assembly renders a vehicle capable of being towed and lifted by means of the bumper.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. In a vehicle including a frame, a bumper, and a pair of bumper impact absorbing assemblies accociated with the bumper, the frame comprising a pair of horizontally extending rails, each rail including a vertical portion and a pair of leg portions extending horizontally outwardly therefrom, each bumper impact absorbing assembly comprising:
   an outwardly extending generally tubular guide element carried by and extending longitudinally outwardly from a respective rail;
   a generally tubular impact element telescopingly received in said tubular guide element for reciprocal movement therein;
   bracket means carried by an outer end of said impact element and being secured to said bumper;
   spring means operably arranged between said impact element and said guide element to yieldably resist movement of said bumper toward said guide element;

piston-cylinder shock absorber means operably connected between and disposed within said guide portion and said impact element to dampen forces of said spring means; and fixed abutment means extending across the path of travel of said impact element to limit the movement of said bumper toward said guide element;

said abutment means comprising a plate having a pair of horizontally extending channels receiving said leg portions and defining therebetween a limit flange;

said abutment means being fixedly secured adjacent the junction of said rail and said tubular guide element, with said limit flange being disposed in the path of travel of said impact element.

2. Apparatus according to claim 1 wherein said tubular guide element and said tubular impact element are each of cylindrical configuration.

3. Apparatus according to claim 2 wherein said shock absorber means is connected between said bracket means and said abutment means.

4. Apparatus according to claim 1 wherein said spring means comprises a coil compression spring disposed around said guide element and said impact element between said bracket means and said abutment means.

* * * * *